Nov. 11, 1930.  G. V. BECKMAN  1,781,428
DISK MOUNTING ATTACHMENT FOR HARROWS
Filed Dec. 4, 1928
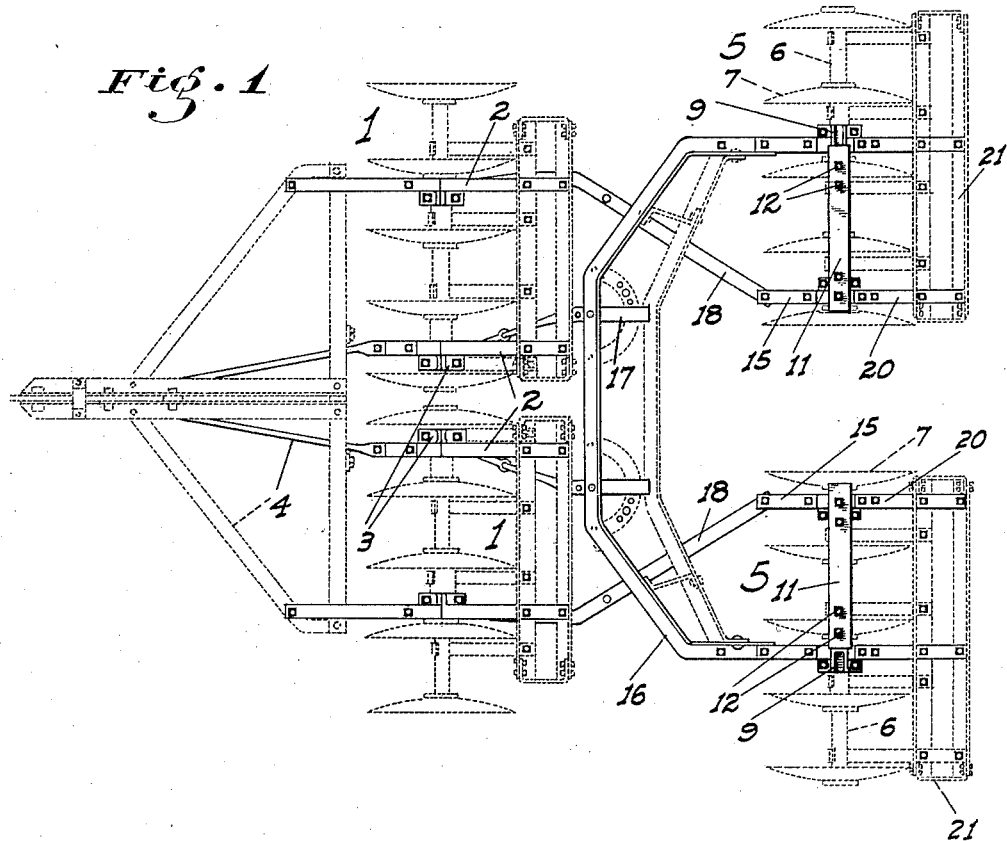
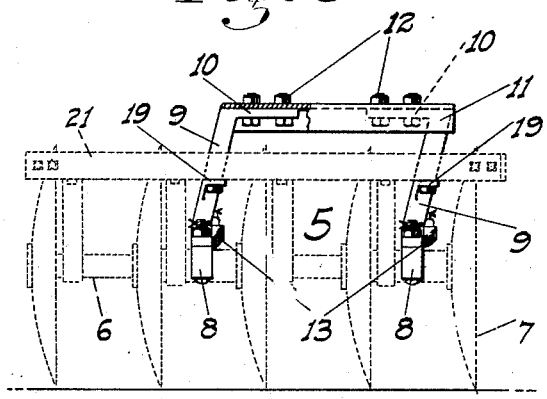
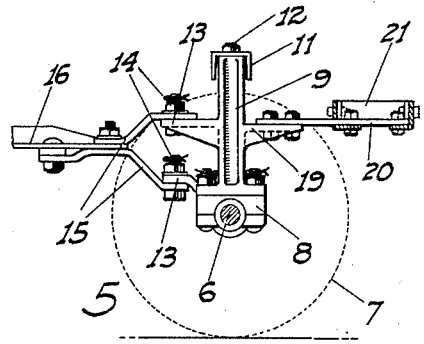
INVENTOR
*G. V. Beckman*
BY
ATTORNEY Patented Nov. 11, 1930

1,781,428

UNITED STATES PATENT OFFICE

GEORGE V. BECKMAN, OF LODI, CALIFORNIA

DISK-MOUNTING ATTACHMENT FOR HARROWS

Application filed December 4, 1928. Serial No. 323,602.

This invention relates to agricultural implements and particularly to a gang disk harrow of what is known as the orchard or trailing type, having transversely separated front disk gangs and similarly spaced rear disk gangs. In harrows of this type the front and rear gang units on the same side are each connected to the other by a pair of draft elements extending diagonally and in crossing relation, so that one draft element extends from adjacent the left hand end of one gang to adjacent the right hand end of the other gang; while the other draft element extends from adjacent the right hand end of said one gang to adjacent the left hand end of said other gang. The result of this arrangement, which is universally employed in one form or another in all harrows of this type, is that with a certain positioning of the gangs relative to each other universally distributed twisting strains in one or more directions (depending on the particular make of the implement) are placed on the journal boxes of the rear disk axles. This causes the boxes to be shifted out of proper longitudinal alinement with each other and consequently causes the axles to bind in the boxes. The disks therefore drag instead of turning, which not only increases the draft load but destroys the efficiency of operation of the disks, apart of course from causing a very rapid wearing of the box bushings to take place.

The principal object of my invention therefore is to eliminate this inefficient operation by providing attachments for rigidly connecting the spaced bearing boxes of the rear gang units, so that regardless of the direction of pull of the draft connections relative to the boxes and axles, the boxes will be retained in rigid alinement with each other and the disk axles and consequently the disks will turn properly and freely at all times.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan outline of a trailing disk harrow of a certain standard make showing my improved rear gang box attachments mounted thereon.

Fig. 2 is a rear end view of one such attachment.

Fig. 3 is a side elevation of the attachment.

Referring now more particularly to the characters of reference on the drawings the harrow structure includes transversely separated front disk gangs 1 having transversely spaced longitudinally extending frame elements 2 connected to the similarly spaced axle boxes 3; to the front ends of which elements the forwardly pulling draft members 4 are connected. Rearwardly of the front gangs are the rear transversely separated rear gangs 5 each of which comprises an axle 6, spaced disks 7 secured thereon and a pair of bearing boxes 8 for the axle disposed between spaced pairs of the disks. The draft connections between the bearing boxes of the rear gangs and the frame elements of the front gangs, and which will be later described, are so disposed as to tend to twist the rear boxes of each gang in one direction or another unless such boxes are rigidly connected together.

I therefore thus rigidly connect the boxes of each rear gang by means of rigid case arms 9 secured to and projecting upwardly from the boxes to points above the disk, substituting such arms for the relatively light bars ordinarily provided and which I merely remove. These arms have horizontal extending pads 10 on their upper ends which are turned toward each other. A heavy inverted channel member 11 extends between and depends over the pads, so that its lower edges are spaced some distance above the top of the disks. This channel is rigidly secured to the pads by bolts 12, the bolt holes in the channel or pads being longer than the diameter of the bolts so that the necessary accurate positioning of the boxes relative to each other may be initially had before the bolts are cinched down.

The arms 9 are each provided with vertically spaced forwardly extending lugs 13 to form connecting means for the pivot bolts 14 of the forked draft yokes 15, which were previously connected to the parts removed and which are not changed in any respect.

The draft yokes of the outermost frame arms of the rear gangs are connected together by a horizontal frame 16, which is flexibly connected to the frame elements 2 adjacent the innermost boxes 3 of the front gangs by links 17, so that the pull from ahead is transmitted diagonally and outwardly from the front to the rear gangs. The draft yokes of the inner frame arms of the rear gangs are connected to said frame elements 2 adjacent the outermost boxes 3 of the front gangs by strap links 18, so that the pull transmitted to said innermost frame arms comes diagonally from the opposite direction to that applied to the other frame arms. As a result of these particular draft connections which are necessary in implements of this character and which are not disturbed or altered in any way, there is a tendency for the bearing boxes of the rear gangs to be twisted relative to each other—a tendency which is positively prevented by the rigid connecting structure between the boxes as above described.

As will be evident the same box connecting arrangement may be provided if desired in connection with the front gangs, but inasmuch as the draft pull on the boxes of the front gangs is practically in a straight ahead direction at all times, this arrangement is not so necessary for the front gangs, being of especial value only when turning abruptly to the right or left.

The arms 9 also have rearwardly projecting lugs 19 for engaging the horizontal straps 20 which support transverse frames 21 which as usual extend across the gangs rearwardly of the disks thereof, and which serve not only to carry ballast or weights, but also as supports for the disk scraping blades which depend from said frames.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In a trailing disk harrow which includes transversely spaced front disk gangs, and frame elements for said gangs; and transversely separated rear disk gangs each comprising a transverse axle, a plurality of spaced disks fixed on said axle; and bearing boxes for the axle disposed between spaced pairs of disks; a frame rigidly connecting the boxes and comprising rigid arms upstanding from the boxes and having horizontal extensions at their upper ends, and a rigid member extending transversely over the tops of the disks and engaging and rigidly connected to said arm extensions, there being draft connections from the arms of each gang to corresponding but opposed connections with the frame elements of the corresponding front gang.

In testimony whereof I affix my signature.

GEORGE V. BECKMAN.